United States Patent [19]
Hart, Jr.

[11] Patent Number: 6,110,360
[45] Date of Patent: Aug. 29, 2000

[54] LOW PRESSURE REVERSE OSMOSIS WATER PURIFYING SYSTEM

[76] Inventor: John E. Hart, Jr., 617 Eastview Rd., Largo, Fla. 33770-3159

[21] Appl. No.: 09/148,433

[22] Filed: Sep. 4, 1998

[51] Int. Cl.⁷ .................................................. B01D 61/12
[52] U.S. Cl. ...................... 210/110; 210/117; 210/257.2; 210/321.72
[58] Field of Search ............................ 210/321.72, 257.2, 210/101, 110, 117, 134, 136, 106; 137/872, 873, 614.16, 614.17; 251/118

[56] References Cited

U.S. PATENT DOCUMENTS

| | | |
|---|---|---|
| 1,540,886 | 6/1925 | Huff . |
| 3,447,774 | 6/1969 | Webb . |
| 3,763,881 | 10/1973 | Jones . |
| 3,887,463 | 6/1975 | Bray . |
| 4,650,586 | 3/1987 | Ellis . |
| 4,705,625 | 11/1987 | Hart . |

*Primary Examiner*—W. L. Walker
*Assistant Examiner*—David Sorkin
*Attorney, Agent, or Firm*—Ronald E. Smith; Smith & Hopen

[57] ABSTRACT

A reverse osmosis water purifier system uses municipal line water pressure to separate pure water molecules from dissolved and undissolved matter. The system makes and stores product water in a sanitary enclosed pressure vessel in the absence of back pressure. A small water cell tank and a hydraulically powered control valve enable delivery at a fast flow rate near line pressure flow rate. The control valve is a combination sensing and multiple valving device that automatically turns on product water when it is called for by a user or an ice-maker. It automatically replaces water that is drawn, then turns itself off when its tank is full. It fast flushes the dirty side of its R.O. membrane while fast flow water is being drawn, and it slow flushes the same side of the membrane while the system is making product water. These alternating slow and fast flushes whisk away residue from a built-in brine restricter. All flushes sweep debris down the drain. The piston of the control valve moves reciprocally with and against water pressure. When moving against water pressure, additional power or bias is required to move the piston against line pressure. In lieu of a conventional mechanical bias, the novel piston levers hydraulic power by providing a trailing end of the piston with a larger surface area than its leading end, resulting in no mechanical bias drag and a greater range of operating pressure.

10 Claims, 10 Drawing Sheets

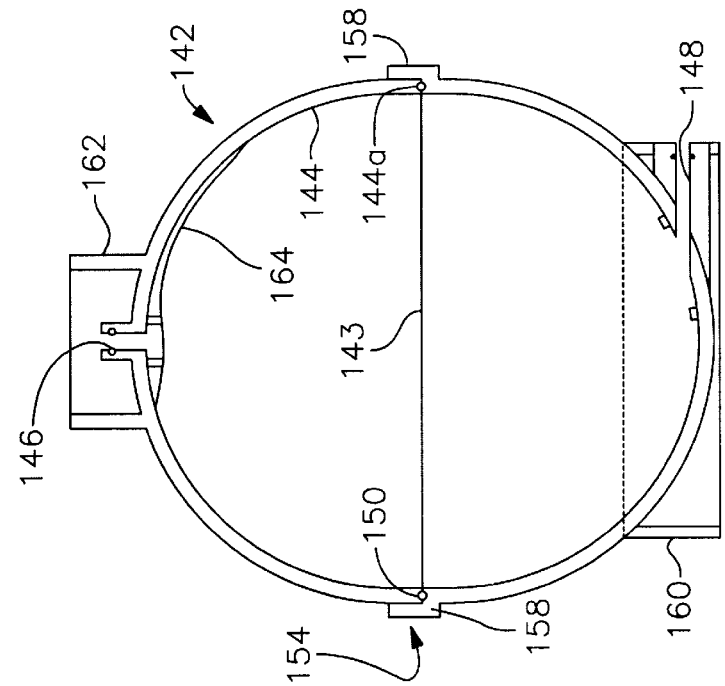
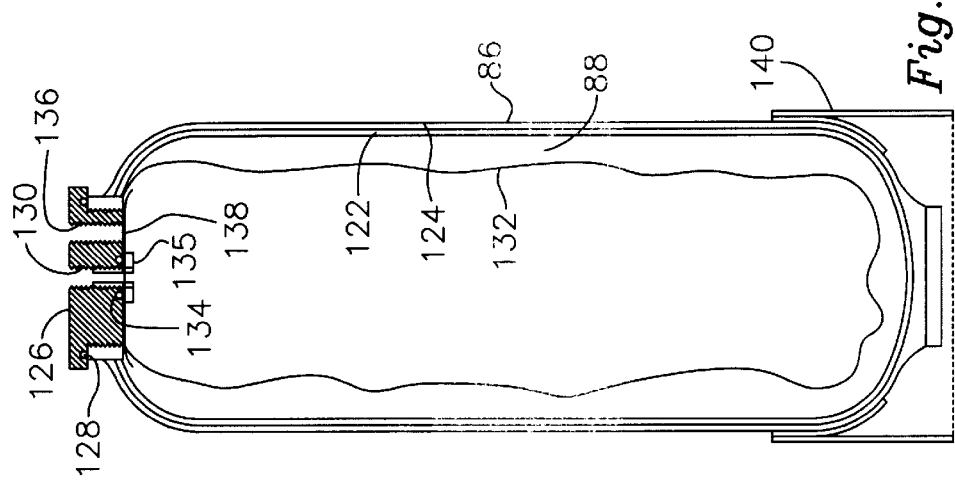
Fig. 7A
Fig. 7B

LOW PRESSURE REVERSE OSMOSIS WATER PURIFYING SYSTEM

BACKGROUND OF THE INVENTION

1. Field of the Invention

This invention relates, generally, to water purifying systems. More particularly, it relates to a low pressure reverse osmosis water purifying system for making and storing product water in a closed pressure vessel in the absence of back pressure.

2. Description of the Prior Art

There are two major categories of reverse osmosis (R.O.) water purifying systems: 1) Those that discharge product water into an open container; and 2) Those that discharge product water into an enclosed container.

The second category has two major subcategories: 1) Systems that discharge product water into an enclosed pressure vessel against back pressure created by an air cell within the vessel; and 2) Systems that discharge product water, in the absence of back pressure, into an enclosed pressure vessel and into a flexible water cell, thereby displacing waste water to drain.

The advantage of open storage systems is that they use all available line pressure to drive water molecules through semi-permeable R.O. membranes, there being no back pressure in such systems. However, costly demand pumps are required to pressurize outgoing product water in such systems. Moreover, such open storage systems are obviously subject to air-borne contamination and are somewhat inconvenient to operate.

Closed container systems of the air cell type are not as subject to air-borne contamination as are open storage systems, but they are subject to the back pressure of the air cells which, essentially, reduces the pressure differential across the R.O. membrane, thereby reducing the quality and quantity of R.O. product water made in a given time. Product water quality particularly suffers if it is frequently drawn off and replaced in small quantities, as typically occurs in household usage.

Moreover, as the air cell-propelled water is emptied from the air cell, the air cell gradually loses pressure and the dispensing flow rate of the product water declines.

While making and storing product water, all R.O. systems waste a predetermined amount of total water to drain; the wasted water is known as "slow flush" water. Some air cell systems continue to waste slow flush water even after the tank has been filled with product water. Accordingly, most air cell systems include an automatic shut-off valve that stops feed water flow, and thus further production of slow flush waste water, when the storage tank is full and reaches 60%–70% of line pressure. This technique, while reducing waste, has the undesireable side effect of also reducing the quantity and quality of the product water and its dispensing flow rate.

The use of demand pumps for increasing dispensing pressure for open storage systems was mentioned above. Slow flow line booster pumps have been used with air cell closed storage systems to overcome low line pressure problems. These are electrically powered with attendant noise, installation, and cost disadvantages. A permeate pump, hydraulically powered by slow flush waste water to drain, slowly raises product water pressure in the air cell tank.

All of these methods provide some improvements, but the open storage—demand pump solution does not overcome airborne contamination and the above-mentioned electrical disadvantages. The line pump almost overcomes the disadvantages of the air cell-created back pressure, but is subject to the above-mentioned disadvantages of electrical equipment. The permeate pump is too slow to practically overcome the deficit of air cell-induced back pressure.

The preferred storage tank is a pressure vessel containing two water-filled compartments of approximately the same size; it is therefore known as a "water-on-water" accumulator. The physical separation between the compartments is movable or flexible so that water pressure in a first compartment influences the water pressure in the second compartment. Each compartment is accessed by different fluid sources so that one compartment may be filling while the other one is emptying. Thus, little or no pressure drop occurs across the compartments until the wall of the compartment acts as a valve and blocks the exit port of the emptying compartment.

Both compartments are pressurized, when product water is drawn, by a control valve having multiple sensing and valving capabilities. Both compartments are then depressurized by the control valve when product water is filling one compartment and displacing water from the other compartment to drain. Limited drain flow (slow flush) is shut off by the control valve when the product water compartment is filled. Valving action is started by manual opening and closing of a product water faucet or refrigerator outlet.

U.S. Pat. No. 4,176,063 to Tyler discloses a hydraulic powered control valve, of the diaphragm type, for a water cell system, and U.S. Pat. No. 4,705,625 to the present inventor discloses a hydraulic control valve, of the piston type, for a water cell system. At lower feed water pressures, diaphragm type control valves open and close more slowly than do piston type control valves. The speed of a diaphragm type valve is in direct proportion to feed water pressure. A piston type control valve maintains a constant, faster opening and closing rate across a wider range of feed water pressures, i.e., such valves are not as dependent upon feed water pressures. The speed of opening and closing valves is an important aspect of an R.O. water purifying system because it affects the operation of collateral equipment in the system.

A piston type control valve thus operates more dependably than a diaphragm type control valve at low feed water pressures, it provides a faster and more complete valving action, and it provides faster product and flush flow rates at any given line water pressure.

Further examples of prior art systems are found in U.S. Pat. Nos. 3,493,496, 3,568,843, 3,542,199, 3,726,793, 3,887,463, 4,971,689, 5,254,243, and 5,460,716.

The most relevant prior art to the present disclosure is believed to be U. S. Pat. No. 4,705,625 to the present inventor. Although the piston type control valve disclosed in that patent performs in a superior fashion to diaphragm type valves, there remains a need to widen the operating range of feed water pressures and to increase the product water and flush flow rate.

There is also a need for an easily interchangeable, self-cleaning brine restrictor, and for a more positive automatic shut-off. Ideally, the brine restrictor and the shut-off means should be built into the control valve as an integral part thereof.

One drawback of the present inventor's earlier spring-biased piston control valve is that it requires a relatively high pressure relative to line water pressure to move the valve for two essential functions: the automatic turning on and off of product water. Both functions cause product water pressure to increase to nearly line pressure and that causes a very low pressure differential across the R.O. membrane. Product pressure increase and subsequent valving action could even stop if the total dissolved solids in the feed water were to exceed a certain threshhold.

Accordingly, there is a need for a piston type control valve that can operate effectively on lower water pressure to move the piston against full line pressure without the aid of a strong mechanical bias means, such as a spring, which bias means would ultimately limit fast flow at the faucet when the piston is moving against the bias means.

An automatic self-cleaning brine restrictor valve which is integral to the control valve is also needed.

However, in view of the art considered as a whole at the time the present invention was made, it was not obvious to those of ordinary skill in this art how the needed improvements could be provided.

SUMMARY OF THE INVENTION

The log-standing but heretofore unfulfilled need for an apparatus that overcomes the limitations of the prior art is now met by a new, useful, and nonubvious invention. The novel reverse osmosis water purifier system includes a control valve having a cylindrical bore formed therein. A piston, preferably formed of Teflon®, is slideably mounted in the cylindrical bore and a plurality of O-ring grooves are formed in the cylindrical bore in longitudinally spaced relation to one another. Each of the grooves are occupied by an O-ring cooperating with the piston to divide the cylindrical bore into a plurality of compartments. A plurality of ports are formed. in the control valve.

The piston has a plurality of instantaneous positions within the bore dependent upon an instantaneous mode of the system, said system having an "at rest" mode, a "dispensing" mode, a "de,d spc)t" mode, and a "make product water" mode. The instantaneous position of the piston determines which ports of said plurality of ports are opened or closed.

The system is in its "at rest" mode when the piston is positioned at a leading end of the control valve. It is in the "dispensing" mode when the piston is positioned at a trailing end of the control valve. The system is in the "dead spot" mode when the piston is displaced a first predetermined distance from the trailing end of the control valve, and the system is in the "make product water" mode when the piston is displaced a second predetermined distance from the trailing end of the control valve; the second predetermined distance is greater than the first predetermined distance.

The clindrical bore has a leading end and a trailing end; the trailing end has a predetermined diameter greater than a predetermined diameter of the leading end. Accordingly, an annular step is formed where the leading and trailing ends meet. The annular step serves to limit travel of the piston in a trailing-to-leading direction.

The piston has a leading end having a leading wall and a trailing end having a trailing wall; the leading wall has a smaller surface area than the trailing wall so that when the annular step is at atmospheric pressure and equal water pressure is simultaneously applied to the leading and trailing walls, the piston is displaced in a trailing-to-leading direction.

The system further includes a reverse osmosis module and an accumulator. The R.O. module has an inlet port, a product water port, and a waste water port; a reverse osmosis filtration element is disposed within the module. The accumulator has a waste water port and a product water port; a nonpermeable, flexible membrane is disposed within the accumulator and divides its interior into a product water compartment arid a waste water compartment.

A first conduit provides fluid communication between the first port of the control valve and the waste water port of the module. A second conduit provides fluid communication between the second port of the control valve and the waste water port of the accumulator. A third conduit provides fluid communication between the third port of the control valve and a drain means. A fourth conduit provides fluid communication between the fourth port of the control valve and a faucet. An inlet conduit provides fluid communication between a source of water under pressure and the inlet port of the module, and an outlet conduit provides fluid communication between the product water port of the accumulator and the faucet. All conduits and connections are for fast flow conditions except the conduits that provide fluid communication between port 3 to drain and between port 4 and a three-way juncture.

A projection, of truncate extent, is formed on an external surface of the leading end of the piston and an internally projecting boss means is formed on an internal surface of the leading end of the cylindrical bore. An axial bore is formed in the leading end, including said projection, of the piston. A second bore is also formed in the piston; it has a first end in fluid communication with the axial bore. The second bore is disposed at an acute angle relative to the axial bore so that it has a second end in fluid communication with an external surface of the piston. The projection is in closely spaced apart relation to the boss means when the piston is positioned at the leading end of the cylindrical bore in the "at rest" mode so that water flows into the axial bore and hence to the surface of the piston through the second bore.

A brine restrictor pin is disposed in the axial bore; the brine restrictor pin has a predetermined external diameter less than a predetermined diameter of the axial bore so that water in the control valve may flow through the axial bore around the brine restrictor pin. The brine restrictor pin is removably mounted in the axial bore so that brine restrictor pins of differing diameters may be selectively positioned in the axial bore to provide differing flow rates of water through the axial bore for differing applications.

The plurality of O-rings, referred to above, is three and includes a leading O-ring, a middle O-ring and a trailing O-ring. The plurality of compartments is four and the plurality of ports is four.

A carbon post filter means is disposed downstream of the product water port of the reverse osmosis module and is in fluid communication therewith. A check valve is positioned downstream of an outlet of the post filter means to prevent entrapped pressurized filtered water from re-entering the post filter means at atmospheric pressure. A trapped circuit is downstream of the check valve; the trapped circuit is defined as a circuit disposed between the check valve, the fourth port of the control valve, and one or more product water outlets.

A first preselected port (hereinafter referred to as "port 1") of the control valve is in fluid communication with a waste water outlet of the reverse osmosis module, a second preselected port ("port 2") is in fluid communication with a waste water side of the accumulator, a third preselected port ("port 3") is in fluid communication with a drain means, and a fourth preselected port ("port 4") is in fluid communication with the trapped circuit.

When the novel system is in its "at rest" mode, all four of the ports are closed, all three O-rings are compressed, and an annular piston groove and a fast flow groove are closed by the leading O-ring and by the middle O-ring. The annular piston groove is formed in the leading end of the piston. The fast flow groove is a shallow annular groove formed in the leading end of the piston-receiving cylindrical bore between the leading and middle O-rings; it is in open communication with port 2.

When the system is in its "dispense" mode, port 1 is open to port 2, port 2 is open to port 1, port 3 is closed, port 4 is closed, the leading O-ring is uncompressed, the middle and trailing O-rings are compressed, the annular piston groove is closed and the fast flow groove provides fluid communication between ports 1 and 2.

When the system is in its "dead spot" mode, port 1 is open and in fluid communication with port 2, but the fluid communication is restricted by the restrictor pin. Accordingly, port 2 is open and in fluid communication with port 1 with the fluid communication being restricted by the restrictor pin. Port 3 is closed, port 4 is closed and all O-rings are compressed. The annular groove is open to port 3 and the fast flow groove is open to port 2.

When the system is in its "making product water" mode, port 1 is open but restricted by the restrictor pin, port 2 is open to inward flow, port 3 is open to restricted outward flow, port 4 is closed, the leading O-ring is compressed, the middle O-ring is uncompressed, the trailing O-ring is compressed, the annular groove is open to port 3 and the fast flow groove is open.

The leading end of the piston is the same length as the extent of the leading, reduced diameter part of the cylindrical bore, but the trailing end of the piston has a length less than the extent of the trailing, larger-in-diameter bore; the difference in extent determines the throw of the piston.

Some systems of this type require a pre-filter upstream of the R.O. module inlet port, dependent upon feed water conditions. The novel system further includes a shut-off valve to incoming pressurized water, and a shut-off valve to isolate the trapped circuit from port 4 for long-term shut-offs.

The accumulator is a storage tank that holds product water that has been made at a slow speed; it is able to dispense product water at a much faster speed.

The projection of truncate extent formed on an external surface of the leading wall of the piston allows a greater in-flow of water from port 1 across the end wall surface when the piston abuts the boss means formed in the leading end of the cylindrical bore when the system is in its "at rest" mode. The truncate projection and the boss means combine to set back the leading wall of the piston from the leading end of the cylindrical bore when the system is in its "at rest" mode. This opens a wider passageway from port 1 which allows a faster initial flow when the control valve changes from the "at rest" mode to the "dispense" mode. Said parts maintain the leading end of the piston in closely spaced apart relation to the leading end of the cylindrical bore when the system is in said "at rest" mode. This set back allows restricted access of restricted water into the fast flow trough formed in the bore to control valve port 2. In addition to complementing the high flow characteristics around the external surface at the leading end of the piston, the boss means also provides a thickened wall to accommodate the threaded part of the brine restricter pill end strengthens the leading end of the control. valve.

The axial bore is formed in the truncate projection and extends into the piston for a distance equal to about two-thirds of the total length of the piston; it is coaxial with the longitudinal axis of symmetry of the valve bore and piston and is precisely formed, holding to a dimension tolerance of one ten thousandth of an inch. The second bore extends in a trailing-to-leading direction at an acute angle from the trailing end of the axial bore to a point on the external surface of the leading end of the piston that is about midway between the leading end of the piston and the leading end of the annular piston groove. The second bore is sometimes hereinafter referred to as "the angled escape channel" and sometimes as the second bore.

The trailing end of the self-cleaning stainless steel brine restrictor pin is slidingly disposed at least in part in the axial bore. A leading extent of the brine restrictor pin is screw-threadedly engaged with a threaded bore formed in the boss means, and a tool-engageable head forms the leading end of the brine restrictor pin. An O-ring maintains a water-tight seal where the tool-engageable head seats against an external surface at the leading end of the control valve. The brine restrictor pin has a predetermined external diameter slightly less than a predetermined diameter of the axial bore so that a precise flow of restricted water proportionate to feed water pressure flows around the brine restrictor pin.

The brine restrictor pin is preferably manufactured by a computer numerically controlled (CNN) Swiss screw machine.

It is a primary object of this invention to provide a closed container reverse osmosis system that operates at a very low line pressure and which is free of auxiliary pumps.

A closely related object is to provide such a system that operates with no back pressure against a closed container-type system.

Another object is to provide a piston-type control valve that operates efficiently over a very broad range of pressures and which is free of springs or other auxiliary bias enhancing means that increase the cost of the system.

Still another object is to provide an R.O. system that does not waste water when a product water tank is full.

Yet another object is to provide an R.O. system having a self-cleaning brine restrictor pin that can be easily changed to vary waste water flow rates to meet differing conditions and requirements.

These and other important objects, features, advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 7A is a sectional view of a collapsible bag type accumulator; and

FIG. 7B is a sectional view of a diaphragm type accumulator.

DETAILED DESCRIPTION OF THE PREFERRED EMBODIMENT

Figure 1:
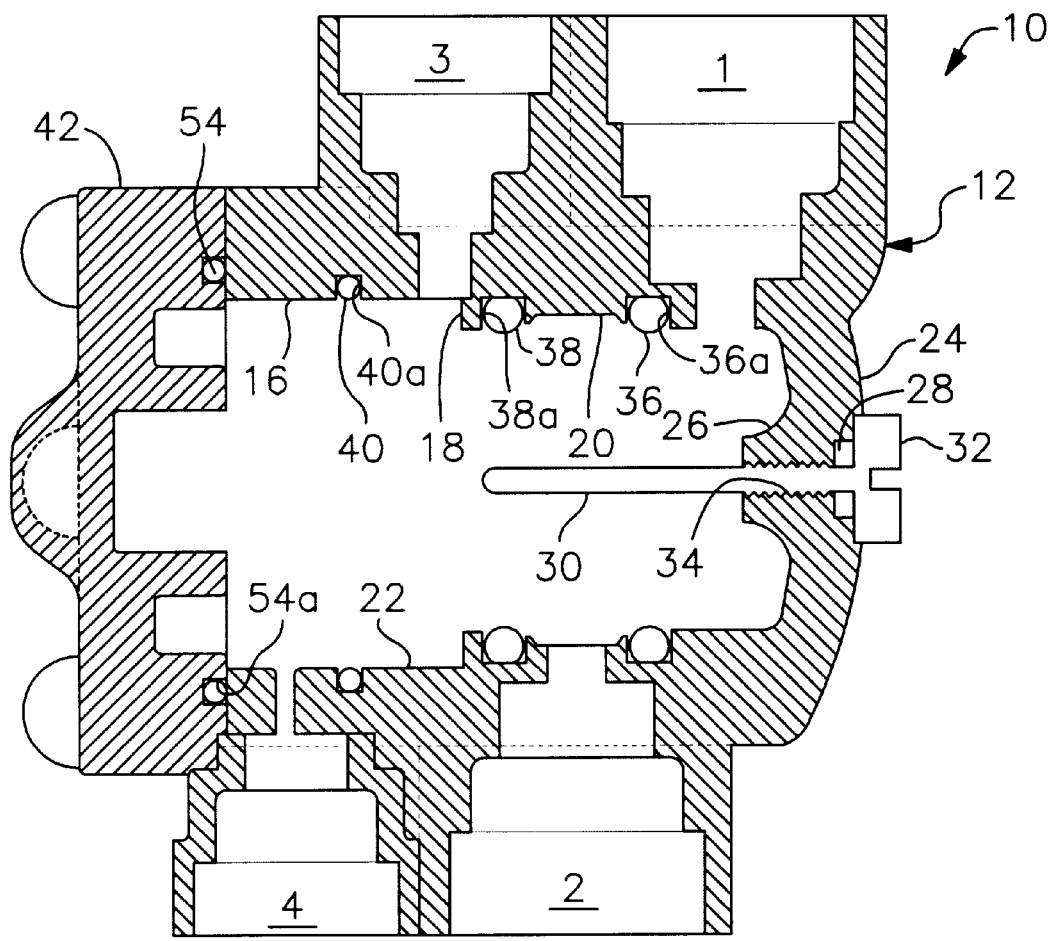
FIG. 1 is a longitudinal sectional view of the novel control valve.
Figure 2:
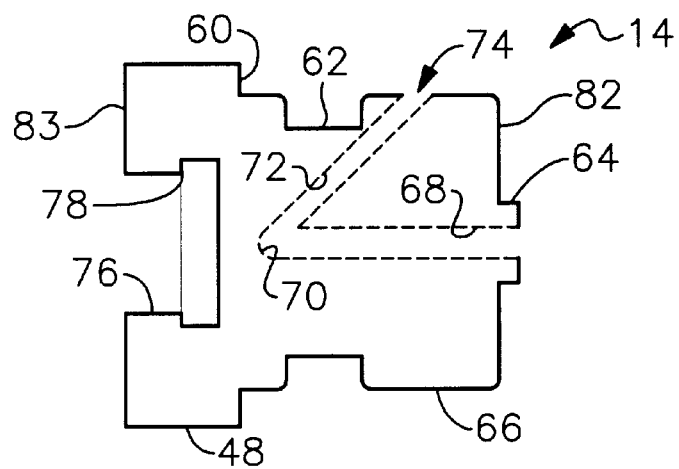
FIG. 2 is a longitudinal sectional view of the novel piston.

Referring now to FIGS. 1 and 2, it will there he seen that a exemplary embodiment of the novel control valve is denoted as a whole by the reference numeral 10.

Control valve 10 includes a valve body 12 and a piston 14 (FIG. 2) that is slideably mounted in cylindrical bore 16 that is formed in said control valve. An annular shoulder 18 divides bore 16 into a leading section 20 and a trailing section 22, the former section having a smaller diameter than the latter.

Four central ports, numbered 1 through 4, extend radially outward from valve body 12, with two ports on a first side being diametrically opposed to two ports on a second side. Each port is adapted to accommodate push tube fittings (not shown). Ports 1 and 2 are sized larger than ports 3 and 4 for fast flow porting, i.e., ports 3 and 4 are sized smaller than ports 1 and 2 for slower flow porting.

The closed leading end of control valve body 12 is denoted 24 in FIG. 1; it is somewhat rounded for extra strength. An internally extending boss means 26 is formed at the center of the leading end 24 and extends a short distance in a leading-to-trailing direction into leading section 20 of bore 16.

The center of leading end 24 is countersunk in its external surface as depicted to accommodate an O-ring 28 and the bottom of a tool-engageable head 32.

An axial-extending internally threaded bore 34 is formed in boss means 26 to accommodate the threaded part of stainless steel brine restrictor pin 30 having a trailing end that extends into the valve bore, and having a leading end in the form of said tool-engageable head 32 for easy removal and exchange.

Three O-ring-receiving annular grooves are formed in bore 16: Leading O-ring groove 36a and middle O-ring groove 38a are formed in reduced diameter bore 20a. Trailing O-ring groove 40a is formed in larger bore 22; the breadth of said trailing groove is less than that of the other two grooves. O-rings 36, 38 and 40 are respectively seated in said grooves and serve to divide bore 16 into four sections so that said four sections and hence each of the control ports, 1 through 4, may be isolated fro)m the other sections and hence the other control ports as piston 14 reciprocates within bore 16.

As depicted in FIGS. 1, 3B, 4B, 5B and 6B, end cap 42 is secured to the trailing end of the control valve body 12 with a plurality of self-tapping screws. Annular groove 54a is formed in the cap and receives O-ring 54 that prevents leakage between the trailing end of control valve body 12 and end cap 42.

Piston 14, depicted in FIG. 2, has a leading end 66 of a first diameter and a trailing end 48 having a diameter greater than said first diameter. An annular shoulder 60 is therefore formed where said leading and trailing ends meet. An annular recess 62 is formed in leading end 66, just forward of trailing end 48; said annular recess is hereinafter referred to as pistol groove 62.

A centrally positioned cylindrical protrusion 64 of truncate extent is formed on the leading end of the piston. An axial bore 68 extends from said protrusion to a preselected point 70 in piston leading end 66. Said axial bore 68 receives brine restrictor pin 30 (FIG. 1) when novel control valve 10 is in its assembled configuration; it should be understood that the internal diameter of axial bore 68 is only slightly greater than the external diameter of brine restrictor pin 30. It should also be understood that the diameter of pin 30 may be changed to meet the demands of differing applications.

Piston 14, depicted in FIGS. 2, 3B, 4B, 5B and 6B, also includes angled escape channel 72 connecting the trailing end of axial bore 68 at point 70 to the cylindrical surface of the piston at a point 74 generally midway between piston groove 62 and the forward wall or nose 82 of piston 14. The angle is an acute angle.

A blind axial bore 76 is formed in the trailing end of piston 14. An annular undercut 78, in open communication with said blind bore at its closed end, provides an annular shoulder which is engaged by a tool, not shown, to retract piston 14 from bore 16 of control valve body 12 when maintenance procedures are to be performed.

For the purpose of computing the driving forces on piston 14, the total surface area of forward wall 82, and the total surface area of rearward wall 83 are considered when calculating leveraged hydraulic bias. Annular shoulder 60 is always isolated from said forward and rearward walls and is always at atmospheric pressure.

Having described the structural components of control valve body 12 and piston 14, the operation of the novel system will now be described.

Figure 3A:
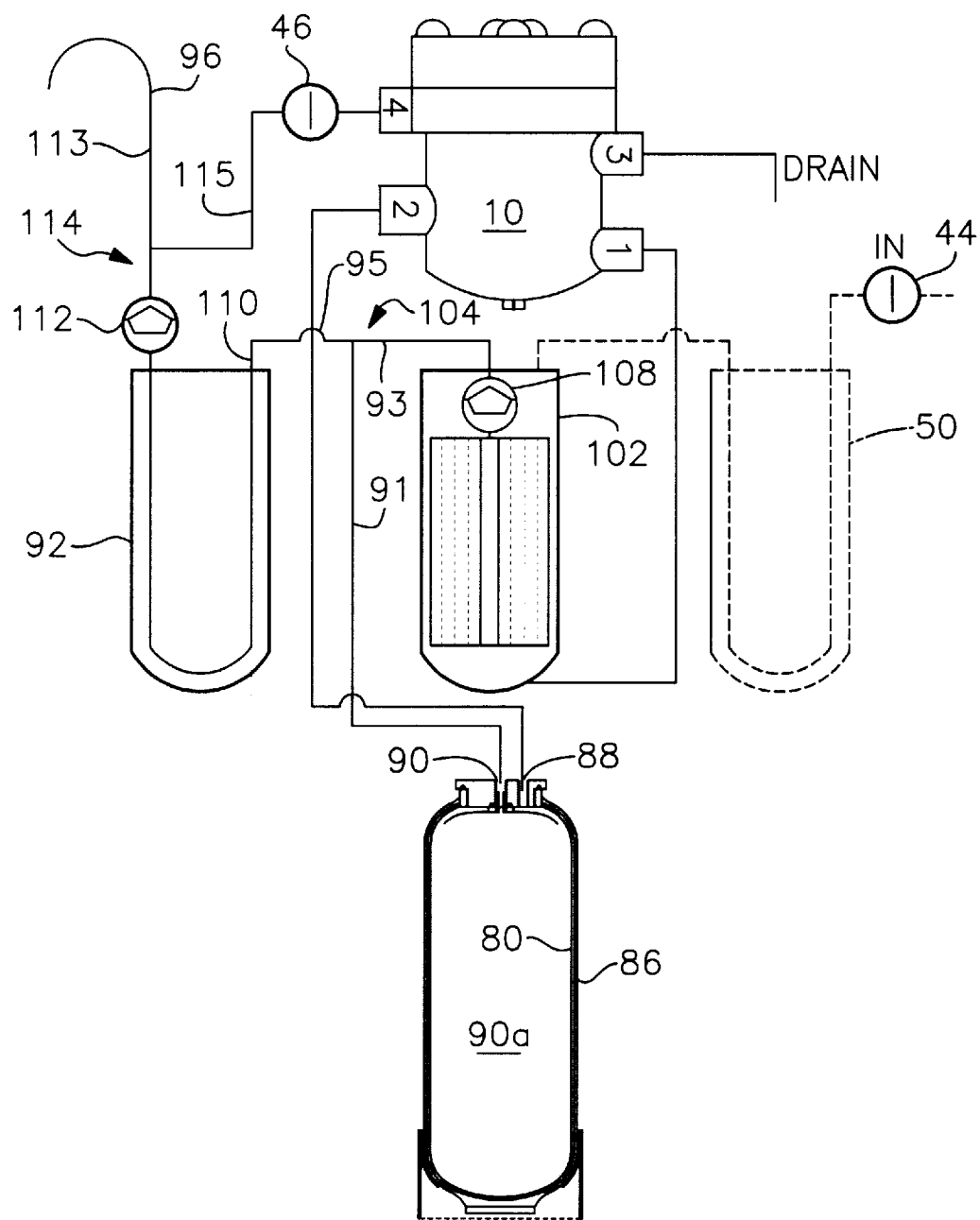
FIG. 3A is a schematic view of the novel system when in its "at rest" mode.
Figure 3B:
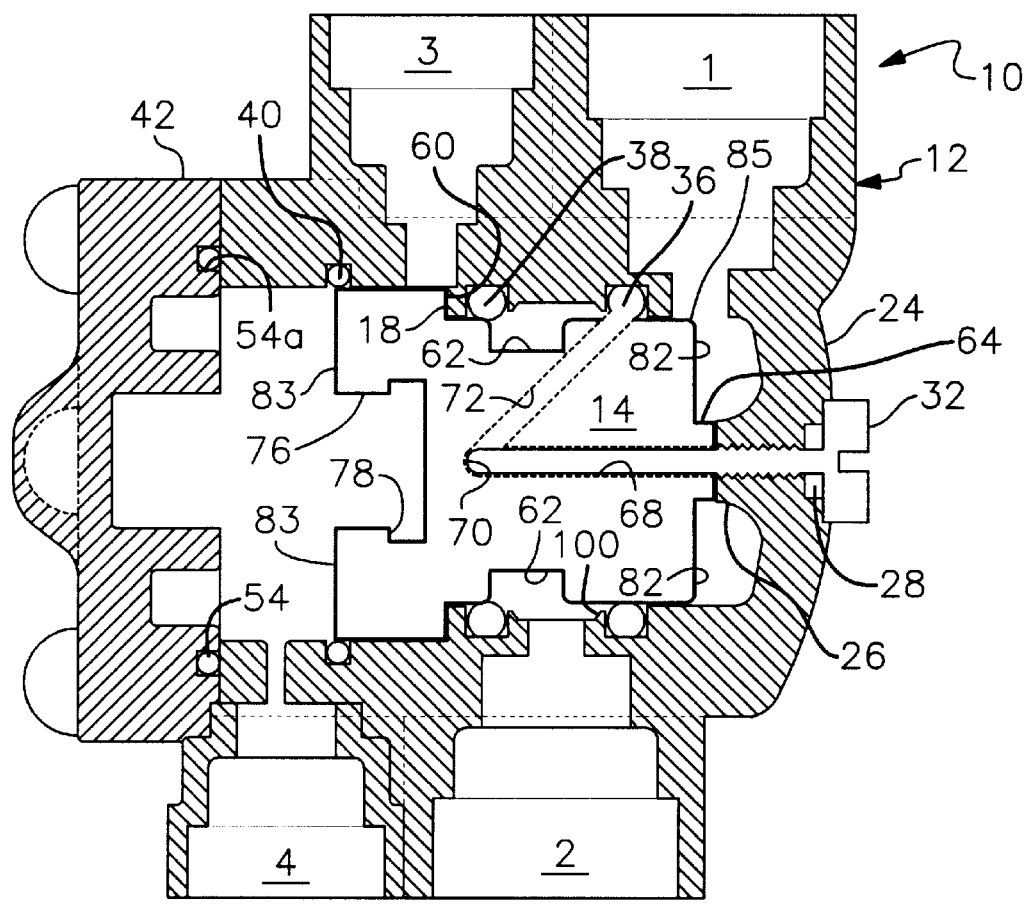
FIG. 3B is at longitudinal sectional view of the piston in its fully extended position, said configuration being the "at rest" mode of the novel system.

FIG. 3A schematically depicts the novel system as a whole when in its "at rest" mode. There is direct fluid contact and full line pressure, but no flow, from the inlet of the source water shut-off valve 44, through an optional pre-filter 50, then over the solute side of the R.O. element 102, to port 1 and, as indicated in FIG. 3B, through brine restrictor pin 30 to port 2, via fast flow groove 100. Port 2, as indicated in FIG. 3A, is in fluid communication with the waste water side 88 of accumulator 86. In FIG. 3A, water cannot enter said waste water side because the accumulator is full of product water 90 and therefore flexible accumulator divider 80 blocks such entry. From this point, downstream product water 90 is also at line pressure, connecting to the out-going side of product check valve 108, post-filter 92, trapped circuit check valve 112, to the "off" valve of product faucet 36, through open trapped circuit isolation valve 46 to port 4 of the control valve and trailing wall 83 of piston 14.

In the "at rest" mode of FIG. 3B, piston 14 is fully extended and truncate projection 64 thereof abuts boss 26. Annular shoulder 60 of the piston abuts the annular shoulder 18 where the leading and trailing ends of bore 16 meet. A water passageway is defined from port 1, around boss 26, through axial bore 68 (around brine restrictor pin 30), through angled escape channel 72, where it is partially blocked by O-ring 36, and into piston groove 62, where it is fully blocked from atmospheric pressure by O-ring 38.

As depicted in FIG. 3A, accumulator divider 80 shuts off water passage to port 2 of control valve 10. Therefore, without egress at port 2 or egress around O-ring 38, full line pressure is applied to ports 1 and 2. Trailing O-ring 40 is compressed by the trailing end of piston 14; the area between O-rings 38 and 40 is therefore at atmospheric pressure. Full line pressure is applied to port 4 of control valve 10; this is caused by the turning off process of the "making product water" mode, as will be set forth hereinafter. Accordingly, equal pressure in pounds per square inch is applied against each end wall 82, 83 of piston 14; however, more pressure is applied to end wall 83 due to its larger surface area. Thus, the force holding the piston in its extended position is greater than the force urging it toward its retracted position.

When a product water faucet is opened in the "dispense" mode, (see FIGS. 4A and 4B), a pressure drop immediately appears across trailing end wall 83 of piston 14 at port 4 of control valve 1). Piston 14 is quickly displaced from its FIG. 3B fully extended position to its FIG. 4B fully retracted position.

Figure 4A:
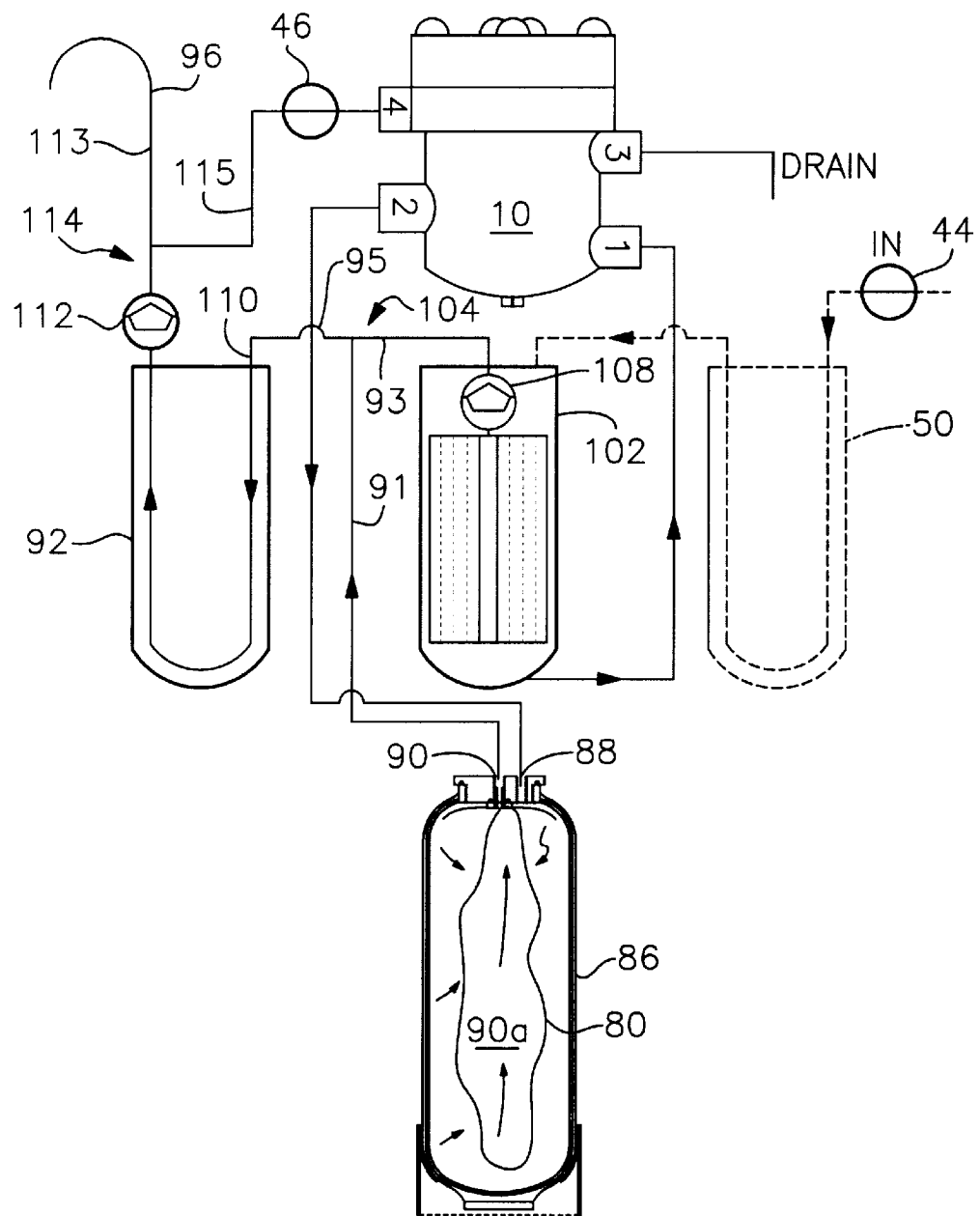
FIG. 4A is a schematic view of the novel system when in its "dispense" mode.

Such quick displacement of the piston causes a fast flow (indicated by large arrowheads in FIG. 4A) of waste water around the leading wall 82 of piston 14; such fast flow waste water flows from port 1 to port 2 through annular fast flow groove 100, formed in valve bore 16 of control valve 12 between O-ring grooves 36a and 38a. As depicted in FIG. 4A, port 2 is in fluid communication with the waste water side 88 of accumulator 86. Accumulator 86 is a relatively large pressure vessel having two water-holding compartments separated by non-permeable, flexible wall 80. First compartment 88 receives waste water from port 2, and second compartment 90 holds product water. Thus, as fast flow waste water enters first compartment 88, fast flow product water in second compartment 90 is displaced therefrom as flexible wall 80 expands into product water compartment 90 under pressure provided by the waste water.

Displaced fast flow product water 90 is piped to three-way way juncture 104, including incoming leg 91 that carries the displaced product water from accumulator 86. A first outgoing leg 93, beginning at said juncture 104, is blocked by product check valve 108. A second outgoing leg 95, beginning at said juncture, carries product water to inlet port 110 of carbon post-filter 92. After flowing through said filter, the product water is directed through trapped circuit check valve 112, to another three-way juncture 114 which is positioned downstream of trapped circuit check valve 112. A first outgoing leg 113 thereof carries product water through open faucet 96 to atmosphere. The second outgoing leg 115 thereof connects said product water to open isolation valve 46, from which product water is directed to control valve port 4 and trailing wail 83 of piston 14. This is the "dispense" mode of the novel system.

Figure 4B:
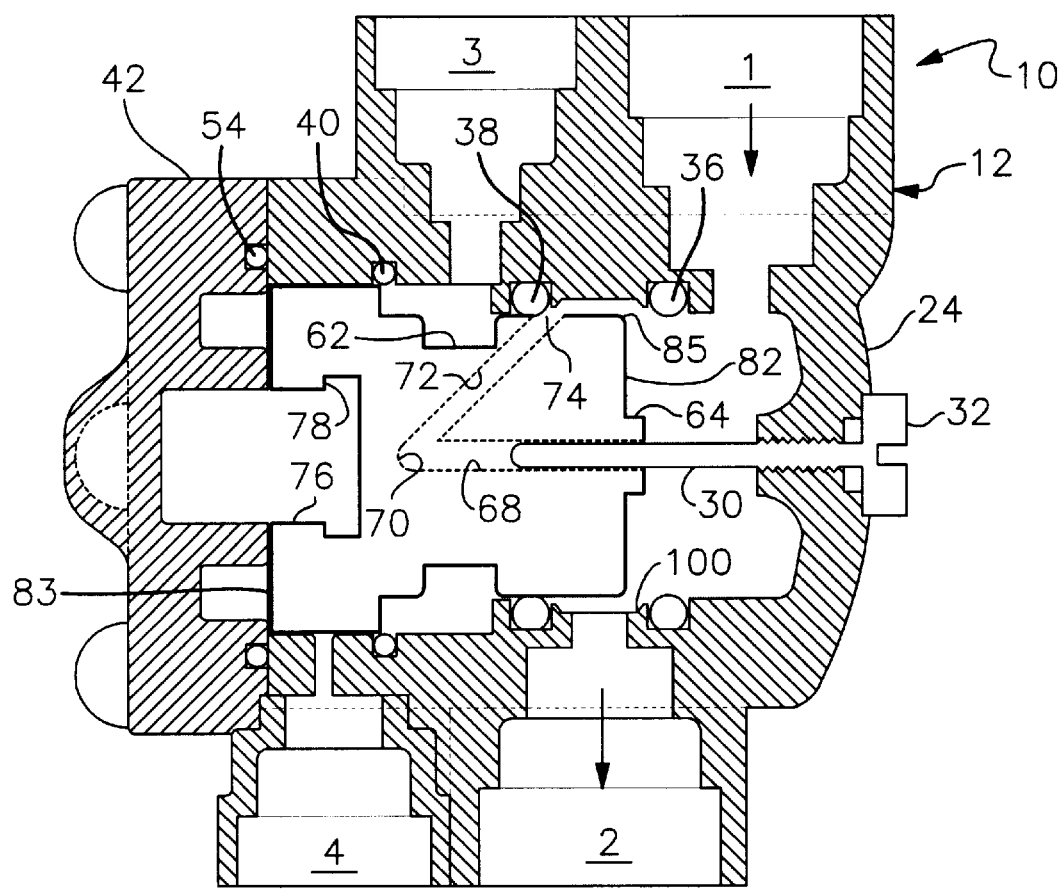
FIG. 4B is a longitudinal sectional view of the piston in its fully retracted position, said configuration being the "dispense" mode of the novel system.

Note that in FIGS. 4A and 4B, waste water from internally connected ports 1 and 2 of control valve 10 is in fluid communication with axial bore 68, which is occupied by brine restrictor pin 30, but is still in fluid communication with incoming water from port 1 via angled escape channel 72. Middle O-ring 38 blocks this pressurized water from contact with atmospheric pressure at port 3. Closing off brine water to drain (port 3) during the "dispense" cycle of operation prevents any dissipation of product flow 94.

Figure 5A:
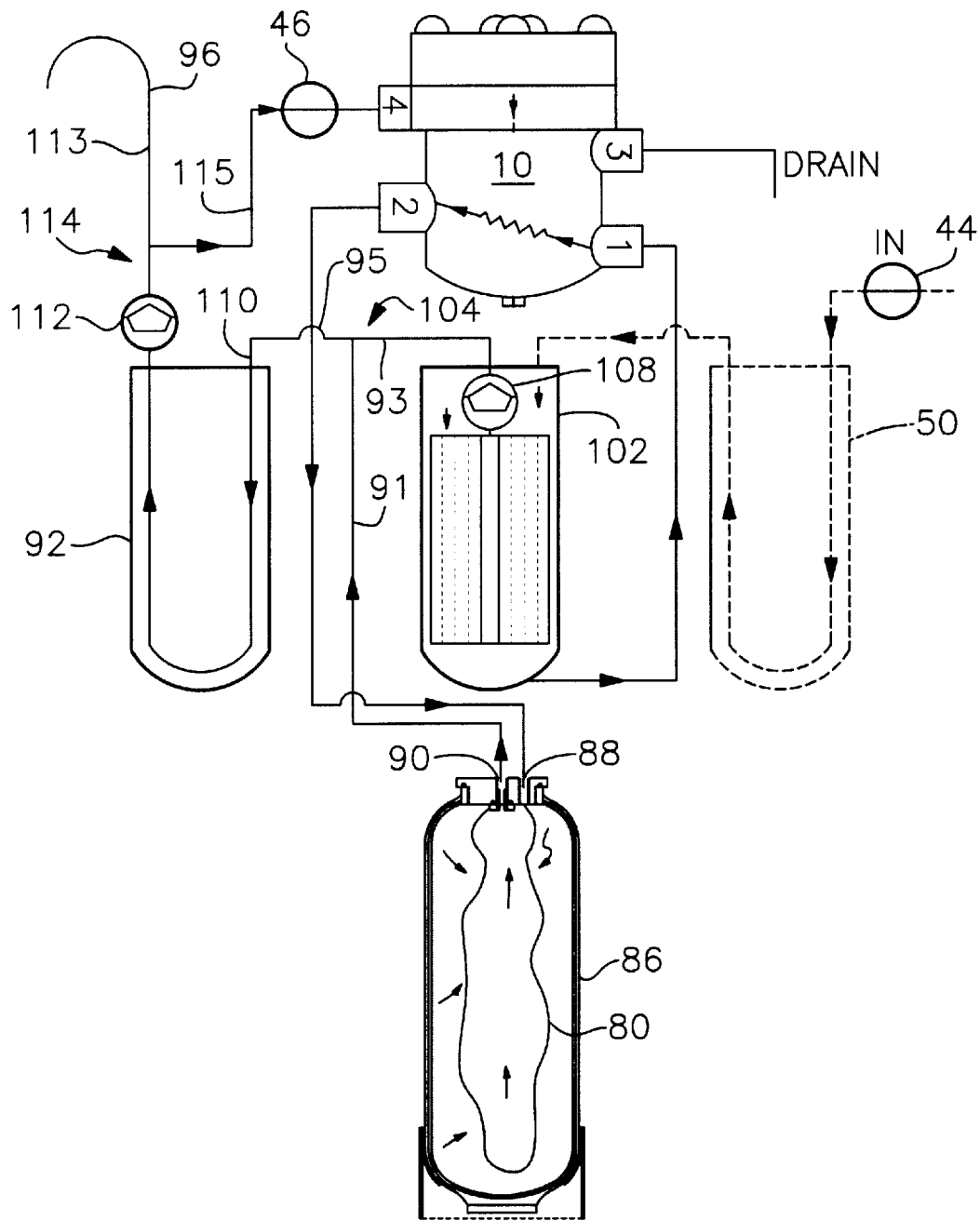
FIG. 5A is a schematic view of the novel system when in its "dead soot" mode.
Figure 5B:
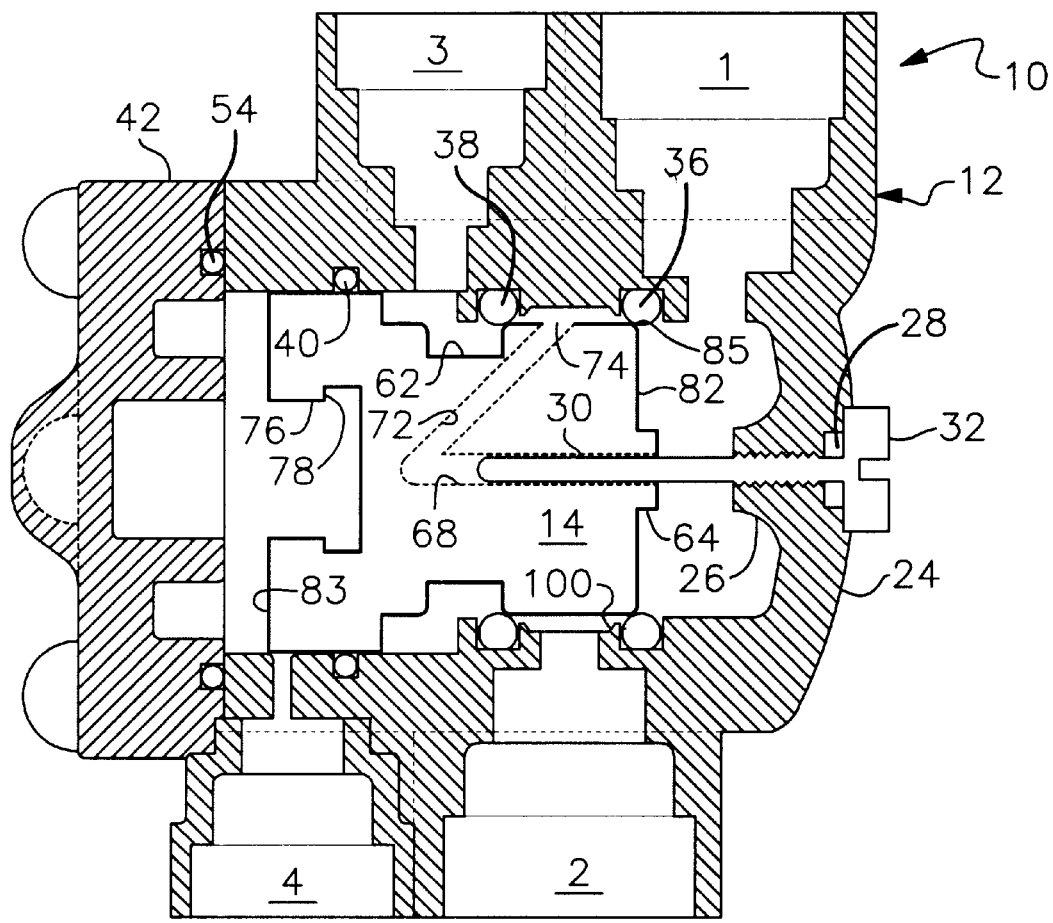
FIG. 5B is a longitudinal sectional view of the piston in a first partially extended position, said configuration being the "dead spot" mode of the novel system.

When faucet 96 is shut off, water pressure rises abruptly on the trailing wall 83 of piston 14 and causes said piston to slide from its fully retracted position (FIG. 4B) toward its fully extended position (FIG. 3B). However, as indicated in FIG. 5B, the motion of piston 14 brings annular bevel 85 (formed in the radially outermost periphery of leading wall 82) into abutting contact with leading O-ring 36. Piston 14 movement stops because O-ring 36 is now compressed and thus shuts off rho high-flow waste water coursing around piston nose 82, through fast flow groove 100, to port 2 of the control valve.

Following the same hydraulic pathway to trailing wall 83 of piston 14 as described above in connection with turning the product water on (FIG. 4A), ambient water pressure abruptly drops to sub-trigger pressure, thereby stopping piston 14 at a predetermined "dead spot" (FIG. 5B). At this dead spot, middle O-ring 38 is compressed on the leading edge of annular groove 62; O-ring 36 is also compressed. Direct slow-flow brine water is flowing from angled escape channel 72, at exit point 74, to port 2 via fast-flow groove 100. Again, following the same hydraulic pathway to trailing wall 83, this restricted flow gradually brings the sub-trigger pressure up to trigger pressure, and starts the piston moving inwardly (trailing-to-leading). O-ring 38, having been poised on the edge of annular groove 62, snaps into said annular groove and dumps all pressure between O-rings 36 and 40 to atmospheric pressure; see FIGS. 6A and 6B.

In slow motion, product water faucet 96 closes, resulting in an abrupt pressure increase to trigger pressure on trailing wall 83. This overcomes piston break away resistance and starts piston 14 sliding rapidly inwardly from its fully retracted position (FIG. 4B). Reverberation (water hammer) to faucet 96 shut-off gives impetus to the still-rising ambient pressure so that the piston slide (which consumes part of such energy) is non-stop and extremely fast, until beveled annular edge 85 contacts and compresses O-ring 36, which contact immediately cuts off fast flow water between port 1 and port 2. This sequence is so fast that the driving pressure just barely exceeds trigger pressure before the piston stops. Momentum carries piston 14 slightly inwardly of the point where it was when the water driving it was shut-off. Therefore, the resulting piston displacement Lowers ambient water pressure to a point just under trigger pressure and consistently stops piston 14 short of the position where O-ring 38 would drop into annular groove 62. This "dead spot" location, as indicated in FIG. 5B, sets the stage for the controlled dumping of pressure behind O-ring 38.

When piston 14 stops at the "dead spot" position, (FIG. 5B), restricted brine water 88 is directed from the piston axial restrictor 106, through angled escape channel 72 to control valve port 2. Referring to FIG. 5A, this restricted flow is directed from said port 2 to the waste water side 88 of accumulator 86, where by positive displacement, pressure hydraulically transcends to a slow flow of product water 90. From said accumulator, this displaced product water 90, being blocked by product check valve 108, proceeds to post filter 92 and to the trapped circuit via check valve 112. In the trapped circuit, this slow flow is blocked by closed product faucet 96 and ultimately reflects on port 4 and trailing wall 83. Piston 14 resists displacement until ambient trigger pressure is reached. At this point, piston 14 restarts its inward movement; such movement is slow because it is limited by the slower flow of brine displaced product water urging the piston in the opposite direction. Finally, the trigger pressure behind O-ring 38 blows said O-ring into annular piston groove 62 which is at atmospheric pressure.

Figure 6A:
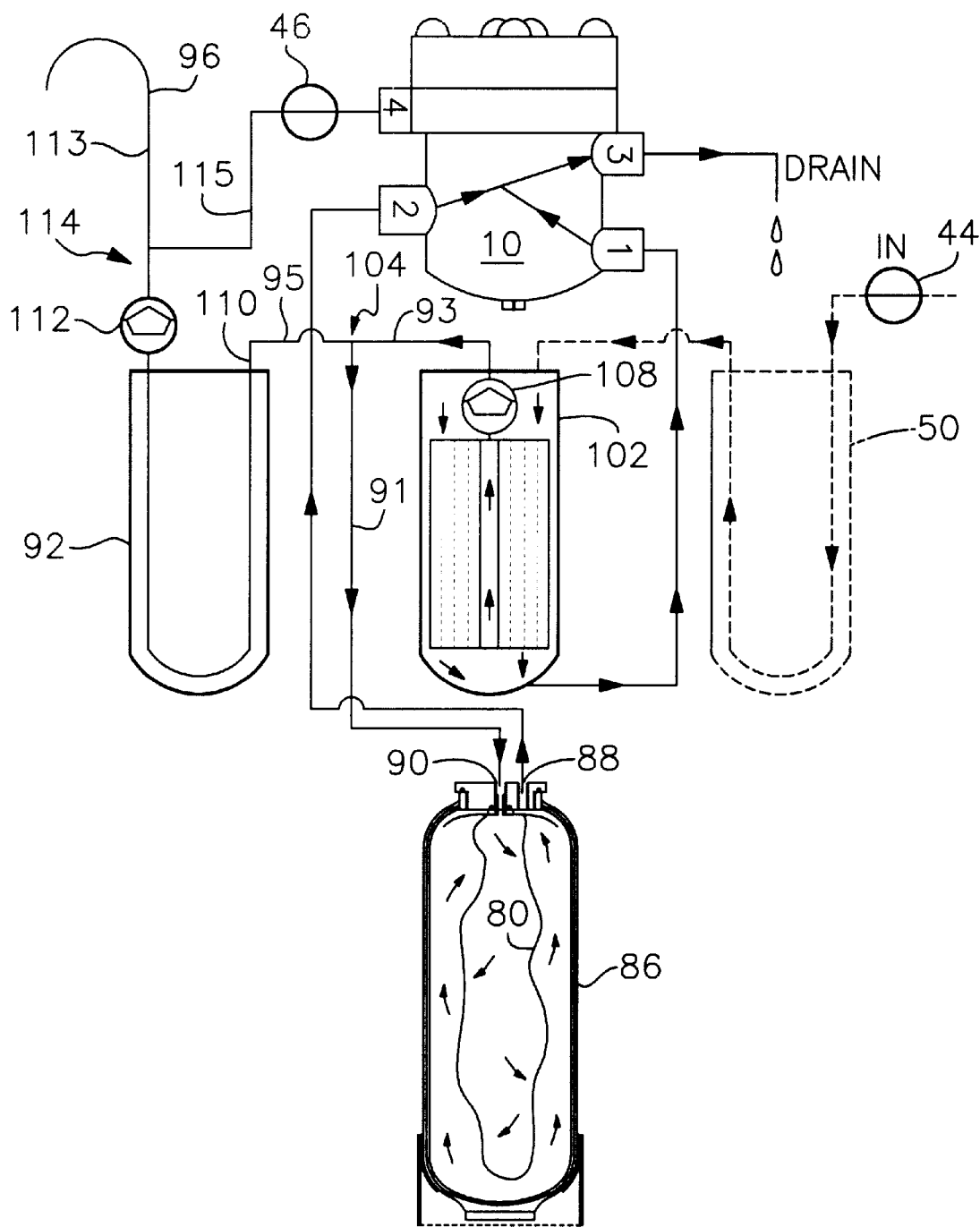
FIG. 6A is a schematic view of the novel system when in its "making product water" mode.
Figure 6B:
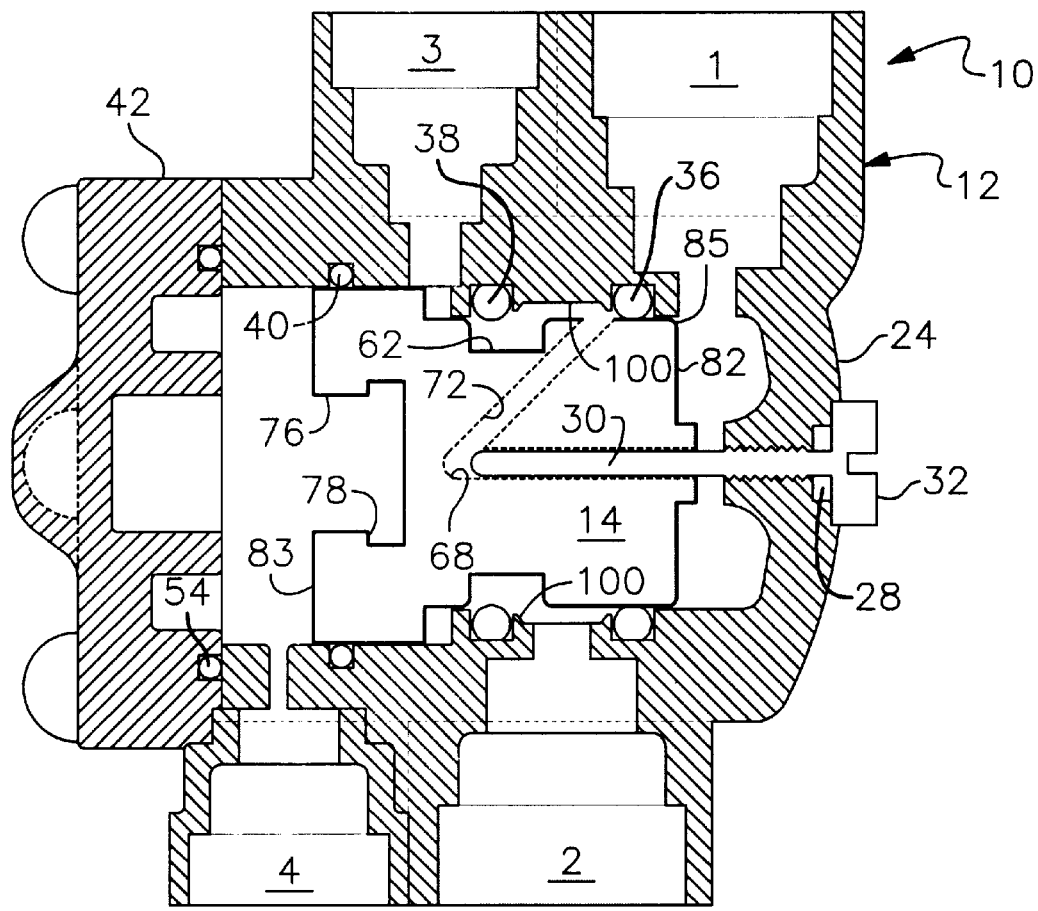
FIG. 6B is a longitudinal sectional view of the piston in a second partially extended position, said configuration being the "making product water" mode of the novel system.

Water pressure then abruptly drops to zero pressure at port 2 of control valve 10, as indicated in FIGS. 6A and 6B, and the system starts its "making product water" mode. Atmospheric pressure follows to the waste water side 88 of accumulate 86, proceeds hydraulically across the accumulator's flexible divider 80 to product water side 90, then exits accumulator 86 to three way juncture 104. From there, zero pressure follows first outgoing leg 93 to the exit of the open product check valve 108 and ultimately to the permeate side of R.O. element 102. Second outgoing leg 95 connects zero pressure to post filter 92, then to the entry point of trapped circuit check valve 112.

Said trapped circuit check valve is spring-loaded and has a very low cracking pressure. Accordingly, it immediately responds to the vacating of upstream pressure by quickly sealing in most of the downstream pressure. That downstream pressure, the trigger pressure driving piston 14 after the "dead spot" was reached, loses a small amount of pressure by the closing of check valve 112. Accordingly, all components downstream from said check valve are at subtrigger pressure and upstream components between said check valve and the R.O. membrane are at atmospheric pressure.

Again, referring to FIG. 6A, full line pressure is applied to entry shut-off valve 44, through optional prefilter 50 to the source water entry port of R.O. module 102. Then, following multiple pathways between the spiral coils of membrane encased in element 102, this pressurized slow flow moves from R.O. module 102 to port 1 of control valve 10.

Referring now to FIG. 6B, from port 1, the leading end of piston 14 is positioned to block any fast flow of water to port 2 by O-ring 36. However, axial bore 68 provides a restricted opening, encroached by brine restrictor pin 30, through angled escape channel 72 and into fast flow groove 100, into piston groove 62, then out to atmospheric pressure at port 3. Said restriction 106 is predetermined and extensive. It therefore backs up pressure effectively equal to line pressure on components upstream, including the solute side of R.O. membrane 102 as well as the optional prefilter and entry valve 44.

A controlled slow flush of water under line pressure therefore passes over the solute side of R.O. element 102. The permeate side of said element is at atmospheric pressure, having been a part of the circuit expunged of pressure when O-ring 38 dropped into piston groove 62. With full line pressure differential and the slow sweep of source water across the R.O. membrane, R.O. module 102 makes product water which is directed to the product check valve 108 of the module, and from there to three way juncture 104 and line 91 to product entry port 90 of accumulator 86.

The product water entering the accumulator does so with no appreciable hack pressure because the product water displaces very flexible divider 80 within accumulator 86 which, in turn, displaces waste water on the other side of accumulator 86. From waste water port 88 of said accumulator, this water is directed to port 2, which is in direct fluid communication with fast flow groove 100, where it joins the restricted source water from angled escape channel 72. The combined flow then encircles decompressed O-ring 38 and flows to port 3 at atmospheric pressure.

The system stays in the "making product water" mode, FIGS. 6A and 6B, until a valve is opened in the trapped circuit by a human user or by an ice maker, thereby triggering the "dispense" mode. If said valve is not opened, the system continues undisturbed, making and storing product water until accumulator 86 is filled. In that event, the valve that closes egress from product water storage is the accumulator divider or bag 80, pressing against the underside of outlet 88 of accumulator 86. Obviously, pressure will increase on all of those components which had been at atmospheric pressure in the "making product water" mode. When this pressure reaches trigger pressure, it will influence port 4 and trailing wall 83 and thereby start movement of said piston in an inward (trailing-to-leading) direction. O-ring 38 contacts and is compressed by the trailing rim of annular groove 62. This stops the restricted outflow of waste water to port 3 and atmospheric pressure, and ultimately backs up line pressure to port 2, thence to all components except those between O-rings 40 and 38 of control valve 10, as perhaps best understood in connection with FIGS. 3A and 3B. Accordingly, the relatively weaker and slower flowing force of product water powers the "0" pressure to trigger phase, and the relatively stronger and faster flowing slow flush waste water powers the trigger pressure to line pressure phase.

The "turning on" phase, like the "turning off" phase just described, is an extension to one of the four positions of the control valve 10. In this case, the system is in its "dispense" mode, with piston 14 extended to the trailing end of the bore, as indicated in FIGS. 4A and 4B.

All previously stored product water 90 is displaced from accumulator 86 while the valve of faucet 96 remains in its open position. Fast outflow of product water from faucet 96 slows to a trickle and represents the speed at which product water is being made by R.O. element 102 with full line pressure differential across the R.O. membrane. However, with the piston in its fully extended position (FIG. 4B), restricted water has a passageway around pin 30 in axial bore 68, through angled escape channel 72 to exit opening 74, where it is blocked by O-ring 38 from port 3, which is at atmospheric pressure. In other words, the system could make some product water without the benefit of slow flush; this could damage R.O. element 102 if allowed to continue.

When a user observes that the fast flow rate of water from faucet 96 has slowed to a trickle, said user will shut-off said faucet. Shutting off said faucet causes an increase in pressure, powered by product water production, that affects those components that are downstream from the R.O. membrane. When the rising pressure reaches trigger pressure, it opens trapped circuit check valve 112 and thereby asserts pressure against trailing wall 83 so that said piston begins a slow displacement through the position depicted in FIG. 5B to the position depicted in FIG. 6B.

This diverts the brine and product displacement water around decompressed O-ring 38 to atmospheric pressure. In this way, a slow flush of line pressure water is established across R.O. element 102. Simultaneously, the release of port 2 to atmospheric pressure reflects back to the permeate side of R.O. element 102, creating full line pressure differential across said element. Thus, maximum permeation and controlled slow rinse of R.O. element 102 assures maximum quality and quantity of the resulting product water.

FIG. 7A is an enlarged sectional view of a collapsible bag type accumulator 86. The pressure vessel includes a blow-molded polyolefin liner 122 with outer reinforcement of filament-wound epoxy/fiberglass laminate 124. A molded thermoplastic cap 126 screws into receiving tank threads at the top of the tank; O-ring 128 provides the needed seal. Port 130 is centrally formed in the cap and is internally threaded to engage external threads formed in a screw means 135 to which collapsible bag envelope 132 is attached; O-ring 134 provides the seal needed at the attachment location. Eccentric port 136 is internally threaded and provides access into the interior of the tank outside of bag area 88.

Collapsible bag 132 is preferably fabricated from 12 gauge polyurethane sheet. It is welded into an envelope shape with product water entry aperture 130 at the top reinforced by canopy piece 138 which extends over eccentric port 136. Accordingly, there are two layers of plastic sealing the bottom of the eccentric cap entry 136; such sealing occurs when the bag is full, thereby providing a secure shut-off.

Bottom stand 140 is a separately molded thermoplastic piece.

FIG. 7B is a sectional view of a diaphragm-type accumulator 142. The pressure vessel, molded with a polyolefin thermoplastic, is made in two (top and bottom) pieces that are joined to one another along a horizontal parting line 143 and to a molded hemispherically-shaped diaphragm 144 inside the tank. A first entry port 146 is provided at the top of the tank, and a second entry port 148 is provided at the bottom of tank 148.

Diaphragm 144, made from a rubbery elastomer, is molded; it has a relatively thin thickness that fits an inside hemispherical surface of the tank. Rim 144a of said diaphragm and O-ring 150 are captured between the top and bottom pieces of the accumulator when said two halves are firmly pressed together.

The two tank halves are firmly held together by a built-in clip 154 that is molded into the rim of the bottom half. Dogleg 158 is formed integrally with the lower half of the tank; it receives and supports the lower rim of the top half of the tank; thus the upper part of dogleg 158 laps the exterior surface of the upper tank half. With the tank halves pressed together, O-ring 150 is compressed and water seals the two halves. The upper edge of dogleg 158 is sonic welded to the upper tank. Alternatively, plastic shear pegs secure the dogleg to the upper tank half.

A lower ring is molded into the bottom half tank to provide stand 160, and a smaller ring is molded into the upper half tank to provide temporary stand 162 for the purpose of bleeding air from the tank when installed.

Note that the diaphragm is thickened as at 164 over the area that contacts the upper and lower inlets.

Although one of ordinary skill in the art can make and use the invention without undue experimentation from the detailed description provided above, the following discussion is provided to provide a deeper understanding of the invention.

In typical use, the accumulator of the novel R.O. water purifier is full of product water and in its "at rest" mode most of the time. With the exception of port 3, which is at atmospheric pressure, all system components are open to line pressure as a result of an automatic system shut down procedure. Thus, line pressure appears on port 4 on the trailing end of the piston. Since the surface area of the trailing end of the piston exceeds that of the leading end, the force holding the piston in its "at rest" position is substantially greater than the full line pressure force pushing against the leading end of the piston.

This is an ideal safety situation. It is almost impossible for outside contaminants to break into pressurized tubing and pressure vessels.

A valve is provided to shut off the system from line pressure for servicing or to put the system in its "at rest" mode for extended periods of time. For such functions, the incoming shut-off valve is used with another shut-off valve that is positioned upstream of port 4 of the control valve. When the port 4 valve is closed, it isolates the trailing end of the piston from one or more product outlets, and when both shut-off valves are closed, (after the system shuts itself off), the piston is locked into its "at rest" position which internally shuts off water into and out of the control valve. All extraneous ports of "raw water in," "pure water out" and "waste water out" are effectively blocked against cross-porting between sewer and water lines. If a leak were to develop in the isolated system, the most that could leak would be a small quantity of water, because water decompresses with very little loss of volume. Compressed air, as in an air cell tank, decompresses with a greater loss of volume.

It should also be noted that in the "at rest" position, pressurized waste water from port 1 can travel through the clearance between the brine restrictor pin and the axial bore it occupies, through the angled escape channel, to the piston side walls, at which point it is blocked by the first or leadingmost O-ring. The second or middle O-ring provides redundant blockage to said flow and prevents it from entering port 3, said port 3 being open to drain. Thus, the system advantageously does not allow restricted brine flow when in its "dispensing" mode.

From the "at rest" position, the control valve can only move to its next position, the "dispense" mode, if the aforesaid extended shut-down valves are opened.

An immediate loss of water pressure against the trailing end of the piston occurs when a product water outlet valve is manually turned on. Unimpeded ingress water then bears against the leading end of the piston at line pressure and provides the power to quickly overcome the break-away resistance of the O-rings and the declining pressure against the trailing end. The piston quickly displaces in a leading-to-trailing (outward) direction and creates a small suction at port 3, as the movement past said port of the annular shoulder formed at the conjunction of the leading and trailing ends of the piston pulls a small quantity of water from said port to replace the small volume needed to fill the void of that retreating annular shoulder. Water displaced by the outward movement of the trailing end of the piston has egress, via port 4, to an open faucet.

Displacement of the piston into its "dispense" mode brings ports 1 and 2 into fluid communication with one another because the leading end of the piston is then positioned outwardly of the first O-ring. This allows a fast flow of water from port 1 to flow around an annular, forty five degree bevel formed on the leading edge or nose of the piston, into a relatively wide but shallow annular groove formed in the bore of the control valve, to port 2. From port 2, the fast flow is directed to the waste water side of the accumulator.

The accumulator, or storage tank, includes a single pressure vessel with two interior watertight compartments separated by a non-permeable but flexible wall. Thus, as waste water enters a first compartment from port 2, an equal amount of previously stored product water is expelled from the second compartment at essentially the same flow rate as that of the waste water entering the accumulator. Displacement transition does very little to change the hydraulic characteristics of the two bodies of water, which are quite different chemically.

The expelled product water is then piped to a three-way juncture, including an incoming leg and a first outgoing leg that connects to an outgoing check valve of the R.O. module. This product water check valve prevents a possibly damaging reverse flow, of water through the module. The second outgoing leg connects the expelled product water to a carbon post filter and hence to a high-flow, spring-loaded check valve, hereinafter referred to as the trapped circuit check valve. The outgoing water from the trapped circuit check valve is separated at another three-way juncture with a first outgoing leg connected to port 4, and a second outgoing leg connected to one or more product water faucets of the system.

Since the entire water passageway, from source water entry "in" to product water "out," requires fast flow water, all piping and plumbing in the passageway are sized larger than needed to provide faucet flow and fast flush module flow commensurate to the superior flow rate characteristics of the control valve. Smaller piping can be used from port 3 to drain and from port 4 to the three-way juncture downstream, from the trapped circlet check valve.

In the "dispense mode," the brine restrictor is shut down by the compressed second, or middle, O-ring as mentioned earlier. In essence, restricted water to drain is stopped when fast flow product water is being dispensed, thereby maximizing faucet flow.

The manual turning off of product water faucets or outlets starts the piston moving back from its "dispense" mode position against an opposing pressure induced by full line water pressure against the smaller, leading end of the piston.

The following assumptions are made regarding the physical properties of water.

1. Water at low pressure and at ambient temperature cannot be greatly compressed in volume.

2. Therefore, an increase or decrease of water volume to or from a pressure vessel filled with water is limited by the amount of air in the water and/or the rigidity of the pressure vessel.

3. Water can only flow into (ingress) an enclosed vessel, if an equal amount of water flows out (egress).

4. Break-away resistance is resistance, in pounds, presented by the O-rings to movement of the piston in the control valve cylindrical bore; this resistance is generally three times greater than the pressure needed to move the piston after the break-away has occurred.

5. Trigger pressure is that water pressure needed against the trailing end of the piston to start and sustain piston movement in a trailing-to-leading (inward) direction against a higher P.S.I water pressure on the opposing leading end.

6. Sub-trigger pressure, appearing on the trailing end of the piston, is less than trigger pressure and is sufficient to stop inwardly-directed piston movement.

7. Mathematically, trigger pressure is expressed as (Line Pressure×surface area of leading end of piston+Break-Away Resistance in force pounds) divided by the surface area of the trailing end of the piston equals trigger pressure in pounds per square inch.

8. If the same water pressure is applied to each end of the piston, a "hydraulic bias" causes piston movement in a trailing-to-leading direction by exerting a greater force against the larger, trailing end of the piston than that applied against the smaller, leading end thereof, if said respective trailing and leading ends are hydraulically isolated from each other, and if the annular shoulder where the two ends meet is isolated to atmosphere pressure. Piston movement is also predicated upon egress and ingress of water to the respective piston ends.

9. The "dead spot" is a piston position where piston movement in a trailing-to-leading direction stops just short of a position where the middle O-ring drops into the annular groove formed in the piston. It is necessary for a more controlled dumping of pressure upstream from the trapped circuit check valve.

10. The "trapped circuit" includes all those components downstream the trapped circuit check valve.

When the faucet is shut off, water pressure abruptly rises above trigger pressure on the trailing end of the piston and pushes said piston in a trailing-to-leading direction from its second, fully retracted position toward its first, fully extended position. However, the motion of the piston brings the forty five degree annular bevel formed in the leading end thereof into abutting contact with the first O-ring. This contact immediately cuts off high speed waste water flow from port 1 to port 2 which, in turn, stops advancement of the piston, just short of a position where the middle O-ring would drop into the annular groove of the piston. The sudden displacement of the piston also dissipates some of the driving pressure to sub-trigger pressure when the piston abruptly stops at the dead spot.

With tie leading or first O-ring compressed against the forty five degree annular bevel formed in the nose of the piston, and the middle O-ring compressed against the inner edge of the piston's annular groove, restricted water from the brine restrictor pin exits the angular escape channel midway between the two O-rings. This effectively isolates and directs the restricted (slow flush) water to port 2 and hence to the accumulator, which with equal flow transition from waste water to product water, is in fluid communication with the post filter and trapped circuit, including port 4 and the trailing end of the piston.

The resulting slow increase of water pressure against the trailing end of the piston raises the pressure from sub-trigger to trigger pressure and starts piston displacement, moving inward in short intermittent steps. The annular shoulder where the leading and trailing ends of the piston meet is also affected by piston displacement. The annular shoulder displacement between the third or trailing O-ring and the second or middle O-ring is vented to port 3 (drain) with no back pressure against inward piston movement. In essence, the surface area difference between the trailing and leading ends of the piston is negated when considering resistance to the trailing-to-leading movement of the trailing end of the piston. Inward advance of the leading end of the piston pushes a small quantity of water ahead of it which egresses from port 1 to brine outflow of the R.O. pressure vessel, around the spiral-wound R.O. element, and out the R.O. pressure vessel entry port, to an optional prefilter, and to an open source water entry valve.

The venting to atmosphere of the annular shoulder of the piston and an unimpeded access of the leading end of the piston to line pressure source water is necessary to the operation of the novel hydraulically biased control valve. Moreover, the controlled and steady power that advances the piston from its dead spot position comes from the brine restrictor pin that is disposed within the piston.

When the beveled leading end of the piston touches the first O-ring and stops piston movement momentarily (the dead spot), brine flow is immediately established to the accumulator via port 2 and its connection to the brine restrictor pin. From port 2, to moving hydraulically through both sides of the accumulator, this restricted brine flow is in fluid communication with the enclosed trapped circuit downstream and therefore slowly starts increasing the pressure therewithin. Upon reaching trigger pressure, the piston starts to move inward.

Reacting to such piston movement, the compressed middle O-ring snaps over the edge of the annular piston groove, powered in part by the unrolling of the O-ring to a decompressed and undisturbed state. From port 2, upstream trigger pressure blows into the zero pressure annular groove with a release of kinetic energy, said energy release being known as the "O-ring break away" phenomenon. This dumps all trigger pressure from port 2, including both sides of the accumulator, the product side of the R.O. element, the post filter and the inlet of the trapped circuit check valve. At the same time, the restricted flow from the brine restrictor is opened to atmosphere at the fast flow groove, as is product-displaced waste water from the accumulator.

A downstream brine restrictor backs up incoming line pressure against the solute side of the R.O. element. The permeate side is at zero pressure. A controlled slow flush carries away particulate matter left from the permeation of pure water molecules through the membrane. With a zero to line pressure differential ratio across the membrane and a controlled slow flush across the solute side of the membrane, product water is made with the highest degree of efficiency; dissolved solids rejection and the speed of product (permeate) recovery is higher than with other comparable systems operating on the same feed water pressure.

Regarding the waste water of the "making product water" mode, the slow flow from the brine restrictor pin is in fluid communication with the cylindrical surface of the piston, and flows around the decompressed middle O-ring and annular piston groove to exit to drain at port 3.

Product water-displaced waste water from the accumulator combines with this restricted flow; it joins the restricted water at port 2.

Water pressure is entrapped at sub-trigger pressure above the fast-closing trapped circuit check valve which is reflected on the trailing end of the piston. This pressure, in P.S.I., is less than the line pressure P.S.I. bearing against the leading end of the piston, but it is in perfect balance with an equal force, including a part of the break away resistance that is exerted against each end of the piston by hydraulic biasing. Accordingly, piston movement is stabilized in the "making product water" mode.

In the "making product water" mode and without open egress at the trailing end of the piston, the piston cannot be displaced ii a leading-to-trailing direction, as would happen if egress were available and if a greater pressure were suddenly imposed on the leading end of the piston. Piston movement cannot occur because so small a water volume cannot be effectively compressed. Going the opposite way (inwardly), egress is open to the leading end of the piston, through port 1 to voluminous incoming line pressure; however, the trailing end of the piston is not open to the ingress of water. Accordingly, water cannot be stretched to displace the piston. In opposing reciprocal movement, the piston is functionally and surprisingly or unexpectedly stable in this "making product water" mode, in spite of normal line pressure fluctuation.

This explains the four main positions, or "modes" of the control valve; however, there are two other piston positions that are variations of the "dispensing" and "making product water" modes, and said positions are important because they rely upon the rising pressure of product water to trigger their action.

The stabilized piston position of the "making product water" mode keeps the system making product water and a controlled quantity of waste water until the accumulator is filled with product water and the flexible accumulator compartment divider presses against the inner surface of the accumulator's waste water exit port, thereby shutting off product-displaced waste water to port 2. Pressure on the product side of the accumulator, fed by the product side of the R.O. module, starts upward from zero pressure to trigger pressure, (typically about 70% of incoming line pressure), at which point the piston moves inward until the leading edge of the annular groove formed in the leading end of the piston contacts the middle O-ring. This impedes, then stops, the escape of restricted water around the O-ring and into port 3 and atmosphere. This stoppage directs increasing pressure of the restricted flow back to the accumulator. That pressure is applied to port 4 and the trailing end of the piston; it keeps the pressure on said end moving upward, from trigger pressure to line pressure. The piston having moved against the inner bore restraints, the middle O-ring is squeezed over the leading edge of the annular groove formed in the piston. The leveraged force holding the piston in its fully extended position is typically 30% greater than the hydraulic force pushing the piston outward.

In summary, product water flow and pressure start the control valve's shutting off process. A greater flow of restricted brine flow at line pressure finishes the job and locks the door, so to speak.

At the other end of the operating cycle, the system turns itself on after emptying all product water from the accumulator. When the "dispense mode" has squeezed all product water from the accumulator by displacing the same with waste water, the open product water faucet slows down to al drip, thereby displaying the amount and quality of product water being made. The sudden cessation of fast flow water and beginning of a slow faucet drip tells the operator that the storage tank is empty of product water. The natural and logical thing to do is to manually shut-off the faucet.

When the product faucet is turned off, pressure immediately begins building up in the trapped circuit and such pressure is applied to the trailing end of the piston; this pressure increase is caused by the production of product water. After reaching trigger pressure, this pressure stops rising and tire piston starts moving inwardly. When the annular groove of the piston reaches the middle O-ring, pressure is dumped downstream from the trapped circuit check valve. At this point, maximum line pressure differential and piston stability are established across the R.O. membrane until interrupted by a call for product water or the automatic shut off of the product water-filled accumulator.

When the system is turning on and turning off, product water pressure must increase from zero pressure to trigger pressure before the piston moves. The lower the trigger pressure, the quicker and more positively such movement occurs. Accordingly, the greater the area of the trailing end of the piston in proportion to the leading end, the lower the trigger pressure necessary to move the piston inward against line pressure P.S.I.

In the "dispense" mode, the piston is in its fully retracted position; this puts the compressed middle O-ring in position to block the restricted flow from the brine restrictor pin to port 3 and drain. Product water is still being made because, with the faucet open, there is zero pressure from the divider-closed product port of the accumulator to the faucet. This puts full line pressure differential across the R.O. membrane therefore causing permeation and the making of product water without the normal cleansing slow flush across the solute side of the membrane. If allowed to continue for any length of time, the concentration of dissolved solids on the solute side of the membrane will increase until some of the concentration will precipitate into hard scale and possibly ruin the membrane.

The abrasion resistance and slipperiness of key moving parts within,.i the control valve contribute greatly to product stability. The automatic self-cleaning of the R.O. module and brine restrictor every time product water is drawn also contributes to stability and long wear. The piston is preferably made of Teflon® or polytetrafluoroethylene, (PTFE), an extremely slippery solid. The O-rings are preferably made of Viton®, a fluorocarbon elastomer having sufficient resiliency to enable it to recover from a deforming force. The brine restrictor pin is preferably made of #304 stainless steel, part of which rides in the axial bore formed in the Teflon® piston.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A reverse osmosis water purifying system, comprising:
a control valve having a cylindrical bore formed therein;
a piston slideably mounted in said cylindrical bore;
a plurality of O-ring grooves formed in said cylindrical bore in longitudinally spaced relation to one another;
each of said grooves being occupied by an O-ring cooperating with said piston to divide said cylindrical bore into a plurality of compartments;
a plurality of ports formed in said control valve;
said piston having a plurality of instantaneous positions within said bore that are dependent upon an instantaneous mode of said system, said system having an "at rest" mode, a "dispensing" mode, a "dead spot" mode, and a "make product water" mode;
said instantaneous position of said piston determining which ports of said plurality of ports are opened or closed;
said piston having a first position at a leading end of said control valve when said system is in said "at rest" mode;
said piston having a second position at a trailing end of said control valve when said system is in said "dispensing" mode;
said piston having a third position at a first predetermined distance from said trailing end of said control valve when said system is in said "dead spot" mode;
said piston having a fourth position at a second predetermined distance from said trailing end of said control valve, said second predetermined distance being greater than said first predetermined distance, when said system is in said "make product water" mode;
said piston having a leading end wall and a trailing end wall;
said leading end wall having a smaller surface area than said trailing end wall so that when equal water pressure is simultaneously applied to said respective leading and trailing end walls, said piston is displaced in a trailing-to-leading direction;
said cylindrical bore having a leading end and a trailing end;
said trailing end of said cylindrical bore having a predetermined diameter greater than a predetermined diameter of said leading end of said cylindrical bore;
an annular step being formed where said respective leading and trailing ends of said clindrical bore meet;
said piston having a leading end with a diameter less than that of a trailing end of said piston and there being an angular shoulder formed where said leading and trailing ends of said piston meet;
said annular step serving to limit travel of said piston in a trailing-to-leading direction when said annular shoulder of said piston abuts said annular step of said cylindrical bore;
a reverse osmosis module having an inlet port, a product water port, and a waste water port;
a reverse osmosis filtration element disposed within said module;
an accumulator having a waste water port and a product water port;
a nonpermeable, flexible membrane disposed within said accumulator, said flexible membrane dividing an interior of said accumulator into a product water compartment and a waste water compartment;
a first conduit for providing fluid communication between a first port of said control valve and said waste water port of said module;
a second conduit providing fluid communication between a second port of said control valve and said waste water port of said accumulator;
a third conduit providing fluid communication between a third port of said control valve and a drain means;
a fourth conduit providing fluid communication between a fourth port of said control valve and a faucet;
an inlet conduit for providing fluid communication between a source of water under pressure and said inlet port of said module;
an outlet conduit for providing fluid communication between said product water port of said accumulator and said faucet;
a projection, of truncate extent, formed on an external surface of said leading end wall of said piston;
an internally projecting boss means formed on an internal surface of said leading end of said cylindrical bore;
an axial bore formed in said leading end, including said projection, of said piston;
a second bore formed in said piston, said second bore having a first end in fluid communication with said axial bore, and said second bore being disposed at an acute angle relative to said axial bore, and said second bore having a second end in fluid communication with an external surface of said piston;
said projection being in closely spaced apart relation to said boss means when said piston is positioned at said leading end of said cylindrical bore in said "at rest" mode so that water can flow into said axial bore and hence to said external surface of said piston through said second bore.

2. The system of claim 1, further comprising:
a brine restrictor pin disposed in said axial bore, said brine restrictor pin having a predetermined external diameter less than a predetermined diameter of said axial bore so that water in said control valve may flow through said axial bore around said brine restrictor pin.

3. The system of claim 2, wherein said brine restrictor pin is removably mounted in said axial bore so that brine restrictor pins of differing diameters may be positioned in said axial bore to provide differing flow rates of water through said axial bore for differing applications.

4. The system of claim 3, wherein said plurality of O-rings is three, wherein said plurality of O-rings includes a leading O-ring, a middle O-ring and a trailing O-ring, wherein said plurality of compartments is four and wherein said plurality of control valve ports is four.

5. The system of claim 4, further comprising:
   a post filter means disposed downstream of said product water port of said reverse osmosis module and being in fluid communication therewith;
   a check valve downstream of an outlet of said post filter means to prevent entrapped pressurized filtered water from re-entering said post filter means at atmospheric pressure;
   a trapped circuit downstream of said check valve;
   said trapped circuit being disposed between said check valve, said fourth port of said control valve, and a product water outlet.

6. The system of claim 5, wherein said first port of said four control valve ports is in fluid communication with a waste water outlet of said reverse osmosis module, said second port of said four control valve ports is in fluid communication with a waste water side of said accumulator, said third port of said four control valve ports is in fluid communication with a drain means, and said fourth port of said four control valve ports is in fluid communication with said trapped circuit.

7. The system of claim 6, wherein when said system is in said "at rest" mode, all four of said control valve ports are closed, all three O-rings are compressed, and an annular piston groove formed in said leading end of said piston and a fast flow groove formed in said leading end of said cylindrical bore are closed by the leading O-ring and by the middle O-ring.

8. The system of claim 6, wherein when said system is in said "dispense" mode, control valve port 1 is open to control valve port 2, control valve port 2 is open to control valve port 1, control valve port 3 is closed, control valve port 4 is closed, the leading O-ring is uncompressed, the middle and trailing O-rings are compressed, an annular piston groove formed in said piston leading end is closed and a fast flow groove formed in said cylindrical bore leading end provides fluid communication between control valve ports 1 and 2.

9. The system of claim 6, wherein when said system is in said "dead spot" mode, control valve port 1 is open and in fluid communication with control valve port 2, said fluid communication being restricted by said restrictor pin, control valve port 2 is open and in fluid communication with control valve port 1, said fluid communication being restricted by said restrictor pin, control valve port 3 is closed, control valve port 4 is closed, the leading and middle O-rings are compressed, an annular groove formed in said piston leading end is open to control valve port 3 and a fast flow groove formed in said cylindrical bore leading end is open to control valve port 2.

10. The system of claim 6, wherein when said system is in said "making product water" mode, control valve port 1 is open but restricted by said restrictor pin, control valve port 2 is open to inward flow, control valve port 3 is open to restricted outward flow, control valve port 4 is closed, the leading O-ring is compressed, an annular groove formed in said leading end of said piston is open to control valve port 3 and a fast flow groove formed in said leading end of said cylindrical bore is open.

* * * * *